United States Patent
Thoppil

(10) Patent No.: US 10,532,281 B2
(45) Date of Patent: Jan. 14, 2020

(54) DATA CENTER TRANSFORMATION SYSTEMS AND METHODS

(71) Applicant: Wipro Limited, Bangalore (IN)

(72) Inventor: Saji Thoppil, Bangalore (IN)

(73) Assignee: Wipro Limited, Bangalore (IN)

( * ) Notice: Subject to any disclaimer, the term of this patent is extended or adjusted under 35 U.S.C. 154(b) by 371 days.

(21) Appl. No.: 14/979,806

(22) Filed: Dec. 28, 2015

(65) Prior Publication Data
US 2017/0120147 A1    May 4, 2017

(30) Foreign Application Priority Data

Oct. 30, 2015    (IN) .......................... 5885/CHE/2015

(51) Int. Cl.
*A63F 13/35*    (2014.01)
*G06Q 99/00*    (2006.01)
(Continued)

(52) U.S. Cl.
CPC .............. *A63F 13/35* (2014.09); *A63F 13/67* (2014.09); *G06Q 99/00* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 8,386,930 B2 * | 2/2013 | Dillenberger .......... | G06Q 10/06 715/706 |
| 9,636,587 B2 * | 5/2017 | Thomas .................. | A63F 13/65 |

(Continued)

FOREIGN PATENT DOCUMENTS

| | | |
|---|---|---|
| WO | WO 2007/072019 | 6/2007 |
| WO | WO 2013/082546 | 6/2013 |
| WO | WO 2014/205409 | 12/2014 |

OTHER PUBLICATIONS

European Search Report dated May 25, 2016 in European Patent Office in counterpart European Patent No. Application 16159950.1. 7 pages.

*Primary Examiner* — James S. McClellan
*Assistant Examiner* — Peter J Iannuzzi
(74) *Attorney, Agent, or Firm* — Finnegan, Henderson, Farabow, Garrett & Dunner, LLP

(57) ABSTRACT

This disclosure relates to systems and methods for gamification of data center transformation. In one embodiment, a processor-implemented method is disclosed, comprising: dynamically generating in real-time, via a hardware processor, a multi-player gaming environment including a plurality of graphical elements; wherein at least one constraint applying to one of the graphical elements reflects a constraint applying to a real-world data center; wherein a configuration of at least one of the graphical elements reflects a configuration parameter of the real-world data center; providing, via the hardware processor, the gaming environment to a plurality of users; modifying, via the hardware processor, the configuration of the at least one of the graphical elements based on game play of the plurality of users; and providing, via the hardware processor, an output indicating a modified configuration of the at least one of the graphical elements for modifying the configuration parameter of the real-world data center.

20 Claims, 14 Drawing Sheets

(51) Int. Cl.
*A63F 13/67* (2014.01)
*H04L 29/06* (2006.01)

(56) References Cited

U.S. PATENT DOCUMENTS

| | | |
|---|---|---|
| 2007/0281772 A1* | 12/2007 | Gwaltney ............... A63F 13/12 463/9 |
| 2009/0005140 A1 | 1/2009 | Rose et al. |
| 2010/0113157 A1 | 5/2010 | Chin et al. |
| 2013/0079128 A1* | 3/2013 | Thomas .................. A63F 13/12 463/30 |
| 2013/0225260 A1 | 8/2013 | Cudak et al. |
| 2017/0140660 A1* | 5/2017 | Morton .................... G09B 9/00 |
| 2017/0197148 A1* | 7/2017 | George .................. A63F 13/63 |

* cited by examiner

| | Data center transformation gamification | Real-world data center transformation |
|---|---|---|
| 711 | Game instance | Real-world data center transformation problem |
| | • Deer plucking fruits | • Virtual machine migration |
| 712 | Game goal | Data center transformation objective |
| | • Deer reaches and plucks fruit | • Virtual machine movement to cloud |
| 713 | Game elements | Data center transformation elements/factors |
| | • Deer | • Amazon Cloud |
| | • Fruit | • Virtual machine |
| | • Hammer | • Compliance rules |
| | Game elements correlation | Data center transformation process |
| | • Distance from deer to fruits | • Virtual machine movement parameters |
| | • Size and physical attributes of deer | • Configuration parameters of cloud |
| | • Size and physical attributes of fruits | • Configuration parameters of virtual machine |
| | • Deer unable to jump to reach a fruit | • More resources need to be allocated |
| | • Deer hit by hammer | • Compliance rules breached |
| | • Deer reaches but unable to pluck fruit | • A serve application not approved to move |
| 714 | Game rules | Data center transformation constraints |
| | • Pre-set height and number of jumps | • Resources allocated for the movement |
| | • Deer can't damage other elements | • Movement can't breach compliance rules/cause damages |

FIG. 7

DATA CENTER TRANSFORMATION SYSTEMS AND METHODS

TECHNICAL FIELD

This disclosure relates generally to data center transformation, and more particularly to systems and methods for gamification of data center transformation.

BACKGROUND

A data center comprises of software and hardware which are sourced and integrated together as a system. Data center transformation represents the process of changing or upgrading a data center to improve its overall functionality and performance. Data center transformation often involves extensive changes that may affect many aspects of data center use, including hardware setups, user accesses, software applications, and business processes. Large scale data center transformation can be very complex as the resultant large scale changes are expected to be undertaken with minimal disruption to operations, processes, and services. Currently, in data center transformation projects, every change involved in the transformation has to be assessed for the impact it creates on the existing environment and the potential benefit, which may require managing the impact by moderating the scope and complexity of the change.

The inventors here have recognized several technical problems with such conventional systems, as explained below. Due to the technical complexity of data center transformation, identifying the problem definition and technical constraints, and communicating it in real-time to a large number of personnel is technically challenging. Further, coordinating the technical analysis and contributions of a large number of technicians in the data center transformation is another technical challenge.

Further, transformation initiatives often fail because of failure to reach agreement on an acceptable balance between the impact and benefit, delay caused by dependency on third parties, or some personnel not being able to comprehend the technicalities or to keep pace with new developments, etc. Furthermore, in cases where transformation projects are complex in nature, there may often be an increase in the number of people and factors involved, an increase in the moderation required between different stakeholders to reach agreement on the desire scope of transformation, and an increase in the amount of time consumed before completing the eventual transformation roadmap.

SUMMARY

Embodiments of the present disclosure present technological improvements as solutions to one or more of the above-mentioned technical problems recognized by the inventors in conventional systems. For example, in one embodiment, a data center transformation system is disclosed, comprising: a hardware processor; and a memory unit storing instructions that, when executed by the hardware processor, cause the hardware processor to perform acts comprising: dynamically generating in real-time a multi-player gaming environment including a plurality of graphical elements; wherein at least one constraint applying to one of the graphical elements in the multi-player gaming environment reflects a constraint applying to a real-world data center; wherein a configuration of at least one of the graphical elements in the multi-player gaming environment reflects a configuration parameter of the real-world data center; providing the real-time dynamically-generated gaming environment to a plurality of users; modifying the configuration of the at least one of the graphical elements in the multi-player gaming environment based on game play of the plurality of users; and providing an output indicating a modified configuration of the at least one of the graphical elements in the multi-player gaming environment for modifying the configuration parameter of the real-world data center. The memory unit may further store instructions that, when executed by the hardware processor, cause the hardware processor to perform acts comprising modifying automatically the configuration parameter of the real-world data center based on the output indicating the modified configuration of the at least one of the graphical elements in the multi-player gaming environment.

In another embodiment, a processor-implemented data center transformation method is disclosed, comprising: dynamically generating in real-time, via a hardware processor, a multi-player gaming environment including a plurality of graphical elements; wherein at least one constraint applying to one of the graphical elements in the multi-player gaming environment reflects a constraint applying to a real-world data center; wherein a configuration of at least one of the graphical elements in the multi-player gaming environment reflects a configuration parameter of the real-world data center; providing, via the hardware processor, the real-time dynamically-generated gaming environment to a plurality of users; modifying, via the hardware processor, the configuration of the at least one of the graphical elements in the multi-player gaming environment based on game play of the plurality of users; and providing, via the hardware processor, an output indicating a modified configuration of the at least one of the graphical elements in the multi-player gaming environment for modifying the configuration parameter of the real-world data center. The method may further include modifying automatically, via the hardware processor, the configuration parameter of the real-world data center based on the output indicating the modified configuration of the at least one of the graphical elements in the multi-player gaming environment.

In yet another embodiment, a non-transitory computer-readable medium storing processor-executable data center transformation instructions is disclosed, the instructions comprising instructions for: dynamically generating in real-time, via a hardware processor, a multi-player gaming environment including a plurality of graphical elements; wherein at least one constraint applying to one of the graphical elements in the multi-player gaming environment reflects a constraint applying to a real-world data center; wherein a configuration of at least one of the graphical elements in the multi-player gaming environment reflects a configuration parameter of the real-world data center; providing, via the hardware processor, the real-time dynamically-generated gaming environment to a plurality of users; modifying, via the hardware processor, the configuration of the at least one of the graphical elements in the multi-player gaming environment based on game play of the plurality of users; and providing, via the hardware processor, an output indicating a modified configuration of the at least one of the graphical elements in the multi-player gaming environment for modifying the configuration parameter of the real-world data center. The medium may further store instructions for modifying automatically, via the hardware processor, the configuration parameter of the real-world data center based on the output indicating the modified configuration of the at least one of the graphical elements in the multi-player gaming environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 illustrates a table showing exemplary data center transformation gaming design considerations in accordance with some embodiments.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure solve one or more of the technical problems mentioned above by converting the problem of determining the data center transformation roadmap to a simulated computer game system, a process referred to as "gamification." Gamification may be considered an evolving technique by which game mechanics are applied to non-gaming applications in order to increase user engagement, motivation, and participation. This approach may be used here in the enterprise domain, since enterprise information systems (EIS) focus mainly on efficiency aspects rather than individual long-term motivation and enjoyment.

In one embodiment, the system may create a computer game that is representational of the real-world data center scenario in an altogether alternative world. The system may use a competitive multiplayer gaming concept to motivate gameplay with rewards and rankings. Stakeholders encouraged to play this competitive simulated game may strive to solve various puzzles in the game context, which eventually may become the required optimal roadmap of the future data center environment. The system may have various interfaces to pull real-time enterprise specific attributes concerned with the real services and convert this into an equivalent game representation.

Figure 1:
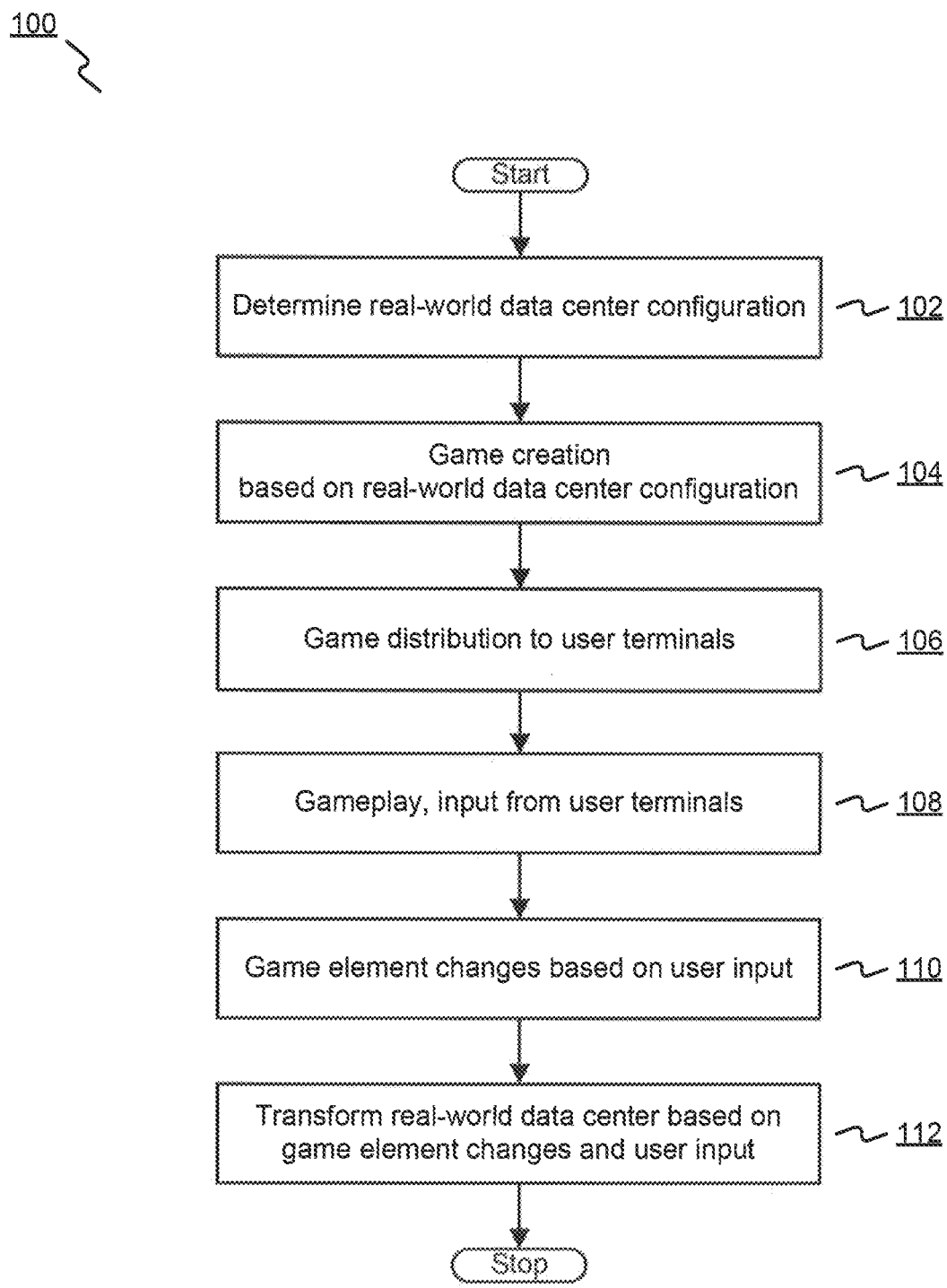
FIG. 1 illustrates an exemplary procedure for gamification of data center transformation in accordance with some embodiments.

FIG. 1 illustrates an exemplary procedure 100 for gamification of data center transformation in accordance with some embodiments. At step 102, a system, such as systems 200 and/or 250, may determine the configuration of a real-world data center. For example, the system may determine information such as a number of computing systems, their interconnection, the performance capabilities of each computing system, the load history experienced by each computing system, and like information. At step 104, the system may engage in game creation based on the real-world data center configuration. For example, the system may, in real-time as the configuration of the real-world data center changes, update a virtual gaming environment to parallel the configuration of the real-world data center. For example, graphical user interface (GUI) elements within the gaming environment may correspond to elements of the real-world data center, and the configuration of the GUI elements may be based in real-time on the configuration of the elements of the real-world data center. At step 106, the system may generate the gaming environment, e.g., a multi-user online game, to user terminals for user to engage in game play. At step 108, the system may accept game play input and other input from the user terminals. At step 110, the system may modify the configuration of GUI elements based on the user input, and, at step 112, the system may transform the configuration of the real-world data center based on the changes to the GUI elements, and the user input into the gaming environment.

Figure 2A:
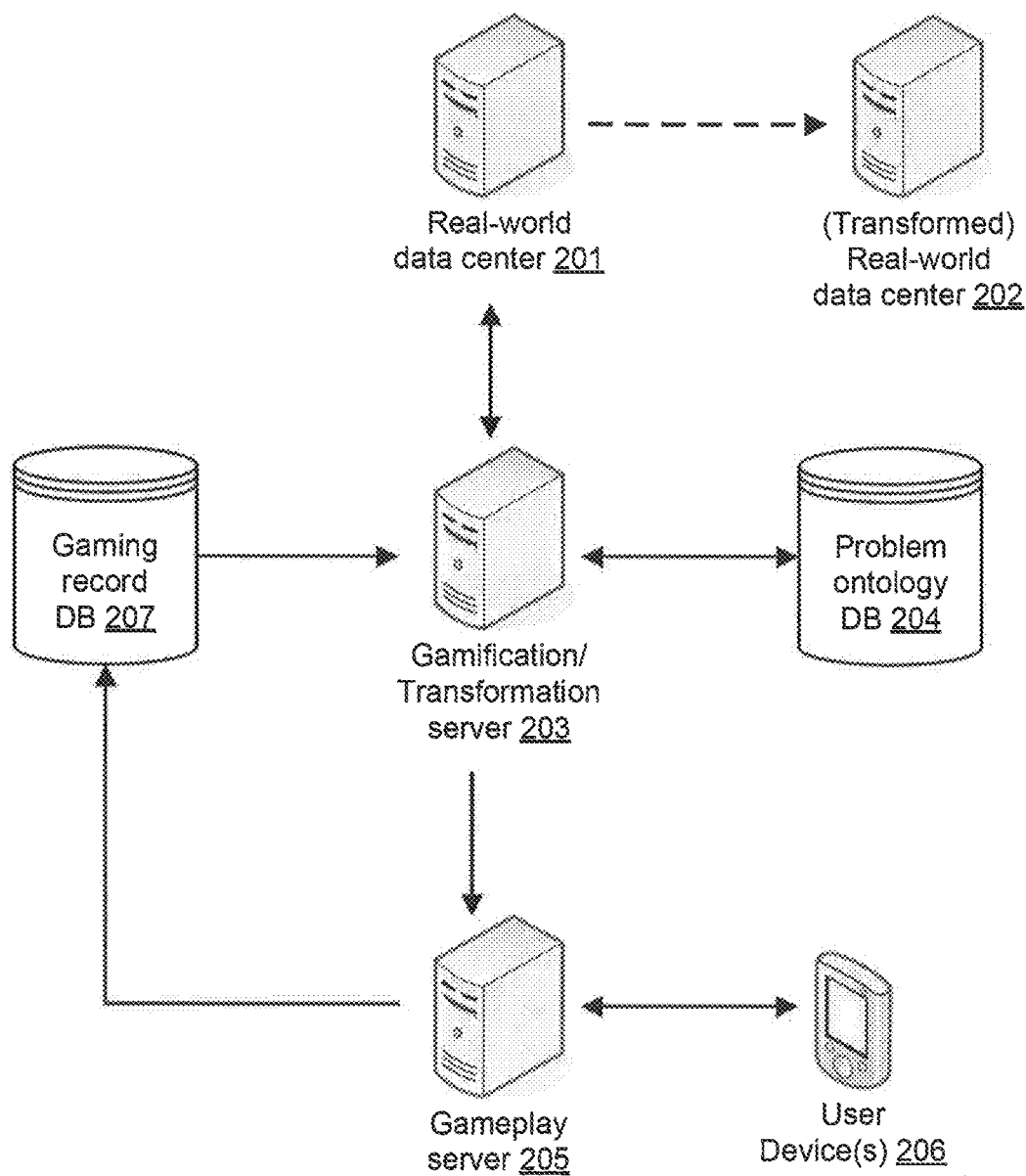
FIGS. 2A-B illustrate exemplary systems for gamification of data center transformation according to some embodiments.
Figure 2B:
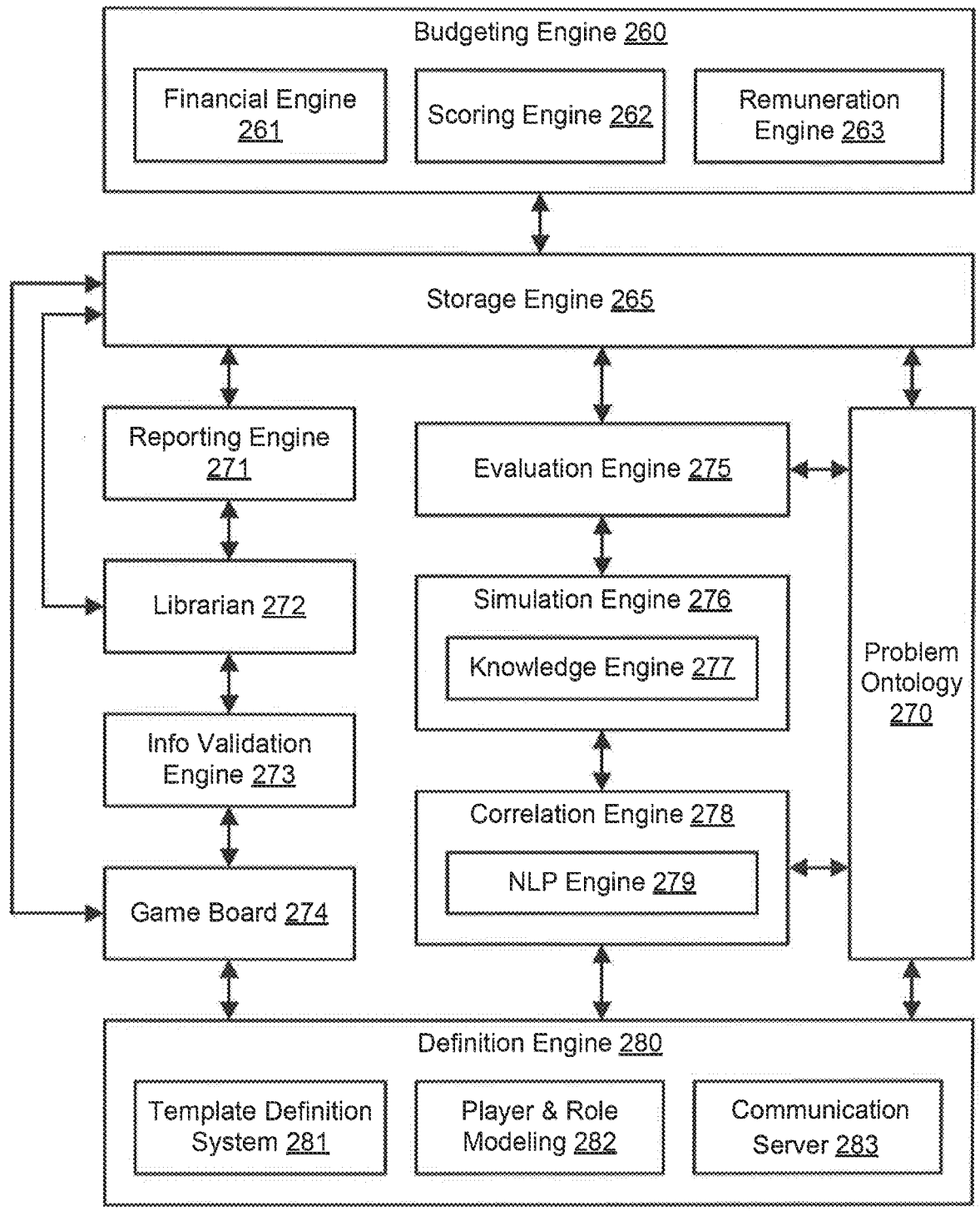

FIGS. 2A-B illustrate exemplary systems 200 and 250 for gamification of data center transformation according to some embodiments. With reference to FIG. 2A, in some embodiments, the method 100 of FIG. 1 may be implemented using a system 200. System 200 may include a real-world data center 201, which ultimately would be converted into a modified real-world data center configuration 202 after transformation by gamification, as explained below. System 200 may include a gamification/transformation server 203, which may obtain the configuration of real-world data center 201. Based on the configuration, gamification/transformation server 203 may populate a problem ontology database 204 with a problem definition to be solved through game play. Gamification/transformation server 203 may generate a real-time online multi-player gaming environment based on the problem ontology and the configuration of the real-world data center 203. A gameplay server 205 may implement the generated real-time gaming environment, and may distribute the gaming environment to a plurality of user devices 206. Based on game play from the user devices 206, the gameplay server 205 may generate gaming records, which may be stored in gaming record database 207. Gamification/transformation server 203 may use the gaming record to determine modifications to implement to the configuration of the real-world data center 201, and thus may transform the configuration of the real-world data center 201 to yield transformed real-world data center 202.

With reference to FIG. 2B, a high-level design of a system 250 for gamification for datacenter transformation with its building blocks and interactions is shown. The building blocks together may provide the functionality to create a representation of a real world data center scenario in an alternate domain representation fit for a motivational game play. For example, in some embodiments, system 250 may include a Definition Engine 280. The main logic of the system 250 including the Game Play logic may be retained here. The Definition Engine 280 may include a Template Definition System 281, a Player & Role Modeling System 282, and Communication Server 283. In some embodiments, the system 250 may include Template Definition System 281. Template Definition System 281 may store information about various software components of the real-time gaming environment. For example, the information maintained may include Platform Class definitions, Platform Object Attributes, Domain Ontology and Relationship mappings, Platform Applied Formulas. Instance Problem attributes. Instance object attributes. Instance Relationship mappings, and Instance arena details.

In some embodiments, system 250 may include a Player & Role Modeling System 282. Player & Role Modeling System 282 may store information of User, Roles and organization details such as Session User attributes, User relationship, User Weightage, and User Reputation.

In some embodiments, system 250 may include a Communication server 283. Communication server 283 may serve as an external interface to e-mail systems. For example, e-mail may be used for notification to user, groups, subscribers or broadcasts.

In some embodiments, system 250 may include a Game Board 274. Game Board 274 may maintain a session environment in concert with Storage Engine 265. For example, Game Board 274 may help maintain details such as session player game runtime attributes, session player score attributes, session player user interface representation, and session save and restore play attributes.

In some embodiments, system 250 may include an Information Validation Engine 273. Information Validation Engine 273 may validate user data during a Play session. This engine may interface to the Librarian System 272, and may use the information there to validate user game play input.

In some embodiments, system 250 may include a Librarian System 272. Librarian System 272 may store runtime data derived from the knowledge and used during the Play session. The Librarian System 272 may be also responsible for storing various statistics and historical information, including Name of country, System models, Manufacturers, Software names, Protocols, Compliances, and a Session log.

In some embodiments, system 250 may include a Reporting Engine 271. Reporting Engine 271 may be used for data extracting and presentation on information in the Storage Engine 265. All structured and unstructured information in the Storage Engine 265, Knowledge Engine 277, and game runtime information from Game Board 274 may be available from Reporting Engine 271. Available output formats for reports may include HTML, XML, PDF, etc.

In some embodiments, system 250 may include an Evaluation Engine 275. A reasoning engine is maintained within Evaluation Engine 275. The reasoning engine may use problem ontology 270 and domain ontology to validate gaming scenarios as a user assembles and tests new scenarios in the real-time gaming environment.

In some embodiments, system 250 may include a Simulation Engine 276, Simulation Engine 276 may be used when a user assembles a new model and wants it validated for all consistency before submitting as part of game play. This may be done by calculating all key constraints on the total problem hierarchy in the instance.

In some embodiments, system 250 may include a Knowledge Engine 277. Knowledge Engine 277 may contain binding relationships for the Domain and Problem ontology 270.

In some embodiments, system 250 may include a NLP Engine 279 for natural language processing. NLP Engine 279 may include a natural language interface that can be used by user to interface with the Simulation Engine 276. For example, the NLP Engine 279 may do the following to respond back to a user: Interpret a query and convert it to a SPARQL query; submit the SPARQL query to Simulation Engine 276; get RDF results; and display results using a predefined output format.

In some embodiments, system 250 may include a Problem Ontology 270, which may be implemented as a relational database. The relevant problem, its taxonomy and the relation to domain attributers may be captured in the Problem Ontology 270. This ontology may be used to qualify a problem posted, and the choice and validation of solution.

In some embodiments, system 250 may include a Storage Engine 265. Storage Engine 265 may persist all the information associated with the Platform of system 250. Information maintained in the Storage Engine 265 may include: user attributes, gaming attributes, file configurations, game logs, security logs, problem histories, domain object and attributes, problem object and attributes, classes, constraints, external attributes, and user conversations.

In some embodiments, system 250 may include a Budgeting Engine 260, which may maintain the financial aspects of the system 250. In some embodiments, system 250 may include a Financial Engine 261, which may assist in converting user rewards to local currencies. Based on configurable parameters, a Reward can be claimed by a user as cash. These transactions may be handled by this subsystem. This Engine may integrate with external ERP like SAP using WebService APIs.

In some embodiments, system 250 may include a Scoring Engine 262, which may administer scores, gained rewards, relinquishing points, points aggregation, etc. In some embodiments, system 250 may include a Remuneration Engine 263. The accounting of rewards may be handled in this engine. It may provide all the basic functionality of an accounting system including book keeping using basic credit, debit principles, while using rewards as the base units.

Figure 3A:
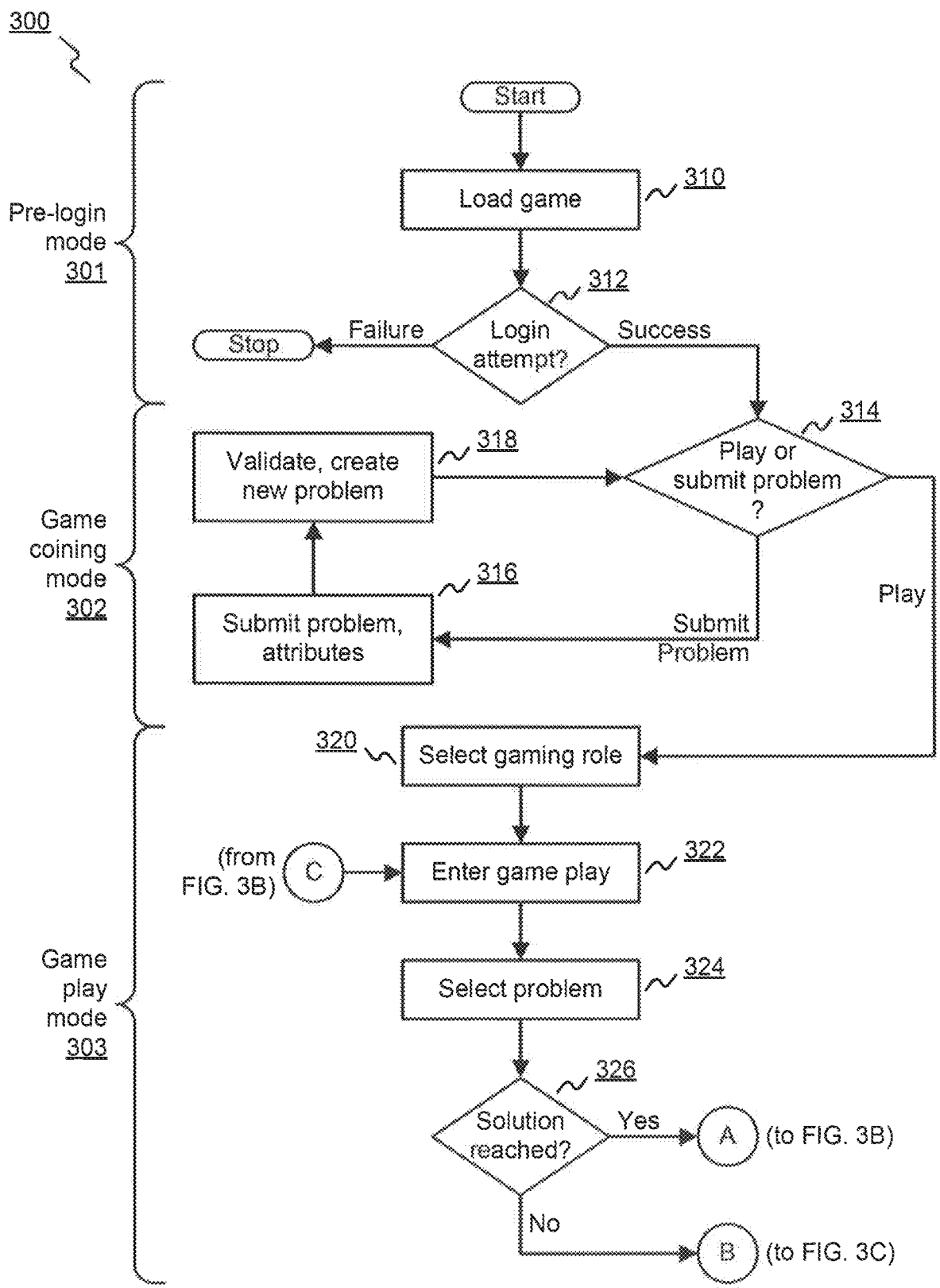
FIGS. 3A-C illustrate an exemplary method for gamification of data center transformation in accordance with some embodiments.
Figure 3B:
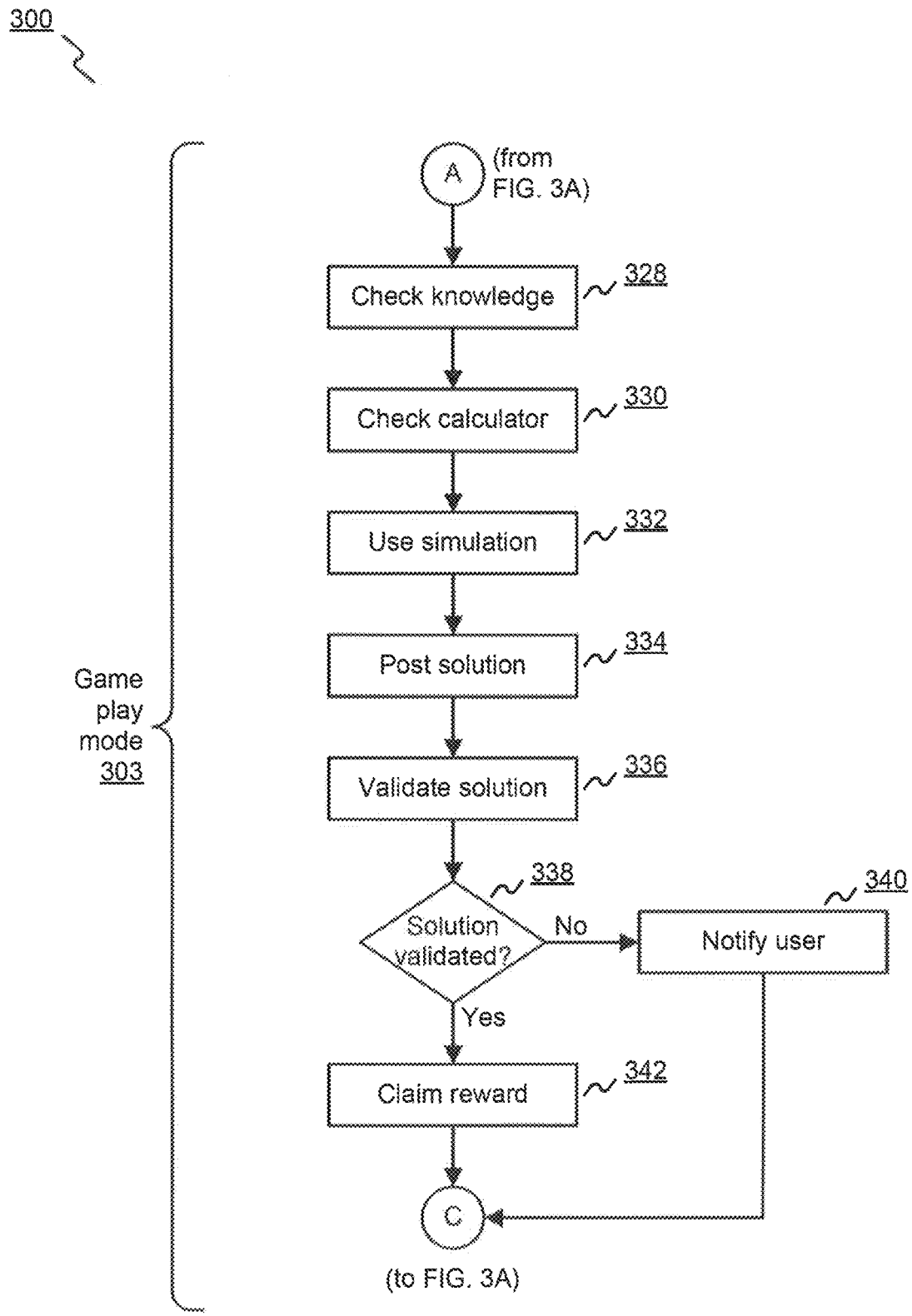
Figure 3C:
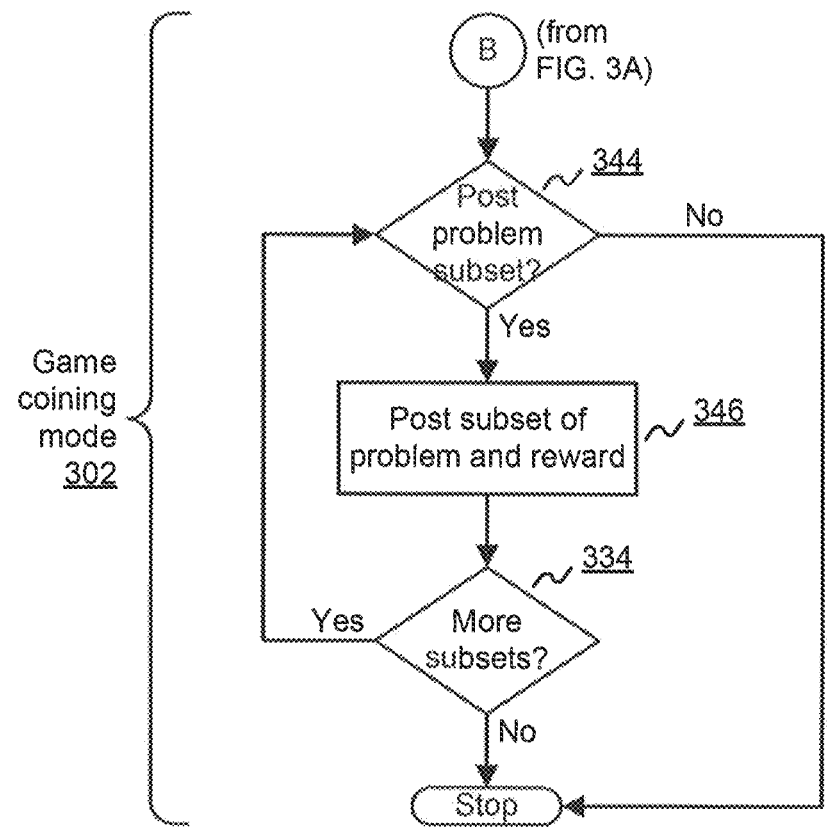

FIGS. 3A-C illustrate an exemplary method 300 for gamification of data center transformation in accordance with some embodiments. In some embodiments, method 300 may include system operations in at least three different modes, called pre-login 301, game coining 302, and game play 303 modes. In a pre-login mode 301, a precondition for a player to enter play in an Instance may be a successful login with bonafide credentials. A minimalistic part of the game in the form of a portal/web pages may be presented until the user completes the login formality. General information about the game, rules, news posts, challenges, blogs, leaderboard, game instances available etc. may be presented in this mode. Activities in this mode may include: presenting a login windows based on the organization instance of the game; user authentication using LDAP; obtaining user attributes, such as designation, location, group, supervisor (assuming the user is an employee or other agent within an organization). A bonafide user may be allowed to enter the play with his or her permitted role in the game, and operate in the other two modes.

In a game coining mode 302, following successful authentication, the player may have the option to enter a user role where she can start building and administering the game. The user may be provided the following facilities: creating and administering the gaming platform; defining a gaming template; design a GUI representation; configuring gaming rules; creating, modifying, or purging instances of a gaming application; importing data from external sources (e.g., Excel, CMDB, etc.); determine relationships between players and GUI elements; setting gaming goals, timers, and rewards; sending invitations to users to join as players; and starting or resuming gaming sessions with a different role.

In a game play mode 303, following a successful authentication, the player may have the option to enter a user role where she can start the play session. The player/user will have the following facilities as explained below. For example, a bonafide user may be allowed to enter the play with his or her permitted role in the game. The user will be able to navigate in the platform and learn and absorb the environment, understand the goals sought, and prioritize the area he/she wants to contribute. A user can enter session and earn rewards by solving a problem in the instance and earn the rewards assigned to the problem by the creator. A user in this mode may resume a saved session and continue where it was left off. The user can also explore the set of posted problems and decide to start a new session. In this mode, the user may be encouraged to engage closely in this phase because of the motivation to earn rewards and get recognized on the leaderboard. Optionally, an organization can decide to provide cash rewards equivalent to the rewards held by a user. The platform may provide the reward management and reporting for this purpose.

In some embodiments, in a play session, the user may focus on a problem and may have to use her expertise to create an alternative scenario on the user interface that is addressing the problem and under the criterion laid down. The user may have to carefully work on the scenario because every action of hers may have logical constraints which may handicap her to undertake unlimited actions. The constraints may be inherent knowledge in the platform which is based on real life constraints concerning the real-world data center. In some embodiments, if the user is struck with a problem, she can post a smaller problem in the instance with its own reward points. Further, the system may also have lookup engine which can fetch and lookup publicly available data/knowledge on internet and present to the user on demand to resolve the problem. In some embodiments, users may be able to team up to tackle complex problems and share the rewards. Some users can have special weightage and can provide input and answers to problems that can override an existing gaming constraint. When all the outstanding problems in an instance are finally solved and accepted by the problem-poster, the rewards may be settled and its distribution committed to all the users accounts.

In some embodiments where players are scored and/or ranked, a weightage of player may be determined by algorithmically evolved reputation, organization hierarchy etc. The user's performance in the gaming environment may be shown on leaderboard and dashboards to encourage competition. A platform moderator team may monitor progress of the game to avoid conflicts which may cause delay or preventing of a solution being reached to the gaming problem.

In some embodiments, the platform may also contain a question/conflict resolution board where subject matter experts can express their views regarding a problem, and can help in progress of the game to come up with productive and implementable ideas. Further, the system may contain a library of mashable patterns to use as ideas across teams/users. The system may also provide a simulation engine to simulate the outcome of a proposed course of action within the gaming environment. The system may also provide an option to perform an instance-level simulation using algorithmic reasoning to check for possible solutions to a sub-problem. In some embodiments, the system can also be made to undertake simulation using multiple permutations and combinations, and determine problems in the gaming environment.

With reference to FIG. 3A, at step 310, in a pre-login mode 301, system 200 and/or 250, may load a gaming environment generated for determining transformations to implement to a real-world data center. At step 312, a user may attempt to log in to the game. If the login is a success, at step 314, in a game coining mode 302, the user may be presented with a choice within the game to either play a game under a set of pre-existing boundary constraints, or to submit a problem to other players for resolution within the gaming environment. If the user chooses to submit a problem, at step 316, the system may accept a user submission of the problem, and, at step 318, validate the problem, and generate a gaming environment update to include the new problem in the gaming environment for resolution through game play. If the user chooses to play the game at step 314, the system may enter a game play mode 303. In game play mode 303, at step 320, the user may be able to select a gaming role, such as builder, hunter, archer, deer, etc., depending on the gaming profiles offered within the gaming environment. At step 322, the user may enter into game play within the generated gaming environment, and, at step 324, may select a problem to address in the game play. For example, this selection can manifest in the form of the user selecting a racing track, a gaming stage, a mission assignment, etc. The user may then play the game based on the selected problem. At step 326, if the user reaches a satisfactory solution to the game (e.g., reaching an end of the gaming stage successfully), the system may proceed to steps depicted in FIG. 3B; otherwise, the system may proceed to steps depicted in FIG. 3C.

With reference to FIG. 3B, in some embodiments, the user may have reached a satisfactory solution to the game (e.g., reaching an end of the gaming stage successfully). In such scenarios, at step 328, the system may check a knowledge base to determine the solution reached is a valid solution. At step 330, the system may perform any calculations to validate the result reached by the user, and if required, at step 332, perform simulations to validate the result achieved by the user. At step 334, if the user solution to the gaming stage needs for validation, the system may post the solution online for review by other players to obtain their input in the validation process, and, at step 336, may perform a final approval or validation of the solution. At step 338, if the solution has been validated, the user may claim a reward within the gaming environment by points or credits (which, in some embodiments, can be translated into an award in real monetary terms based on a financial engine of the system). If the solution has not been validated, at step 340, the user may be notified that the solution the user reached during game play is not valid, and the system may proceed to processing according to FIG. 3C.

With reference to FIG. 3C, in some embodiments, the user may have failed to reach a satisfactory solution to the game (e.g., reaching an end of the gaming stage successfully). In such scenarios, at step 344, the system may, entering a game coining mode 302 again, allow the user to post a problem sub-set. For example, the problem sub-set may be such that the user may be able to solve the problem in his or her assigned game if another user can solve the problem defined by the problem sub-set. If the user posts a problem sub-set, at step 346, the system may generate a gaming environment update, and may post the problem subset and associated reward as a challenge to other users of the system. At step 348, the system may check if additional problem sub-sets remain to be solved in a valid manner, and may allow the user to post additional problem sub-sets for potential resolution by other users through game play.

Figure 4A:
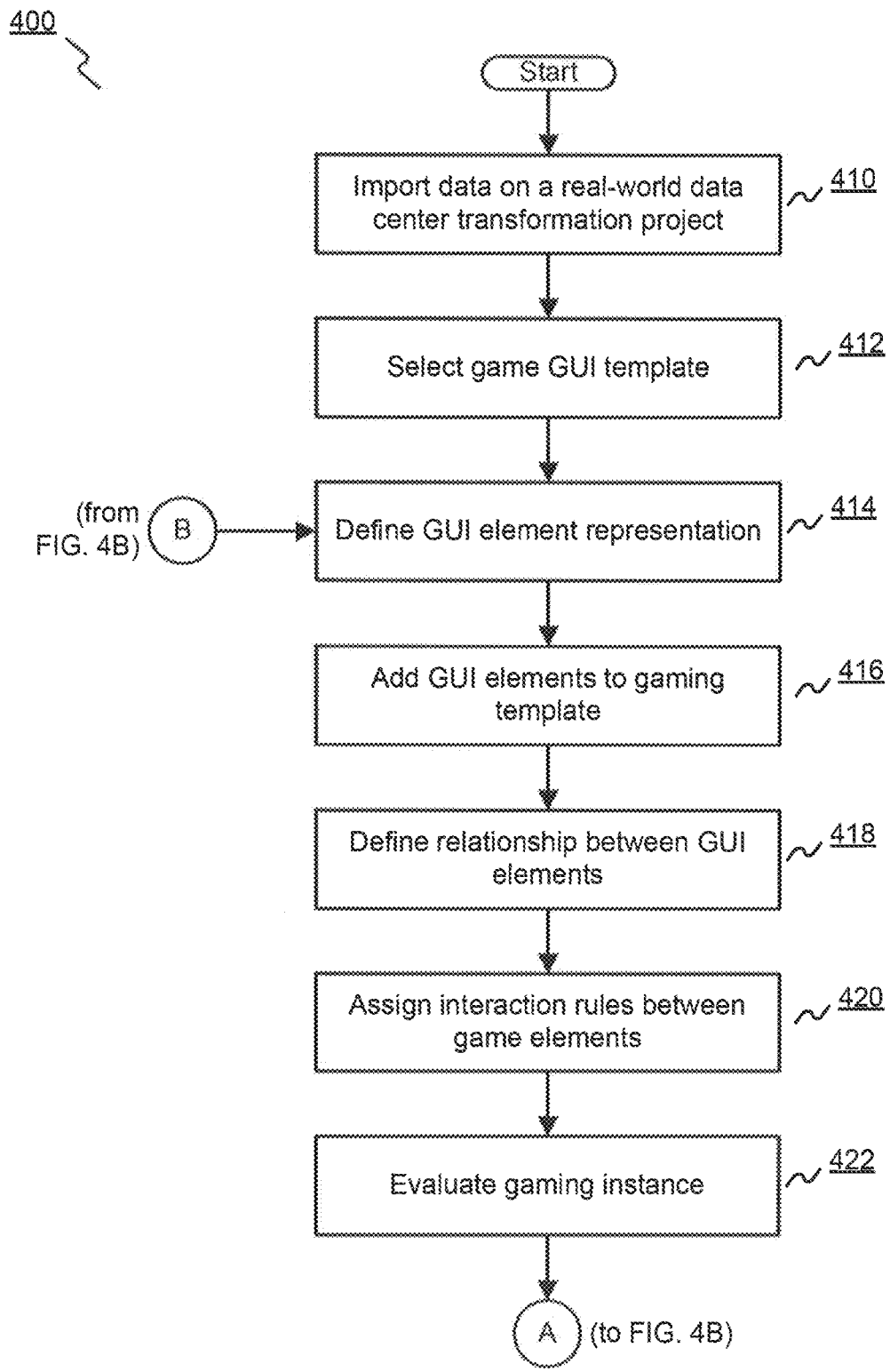
FIGS. 4A-C illustrate an exemplary method for data center transformation in accordance with some embodiments.
Figure 4B:
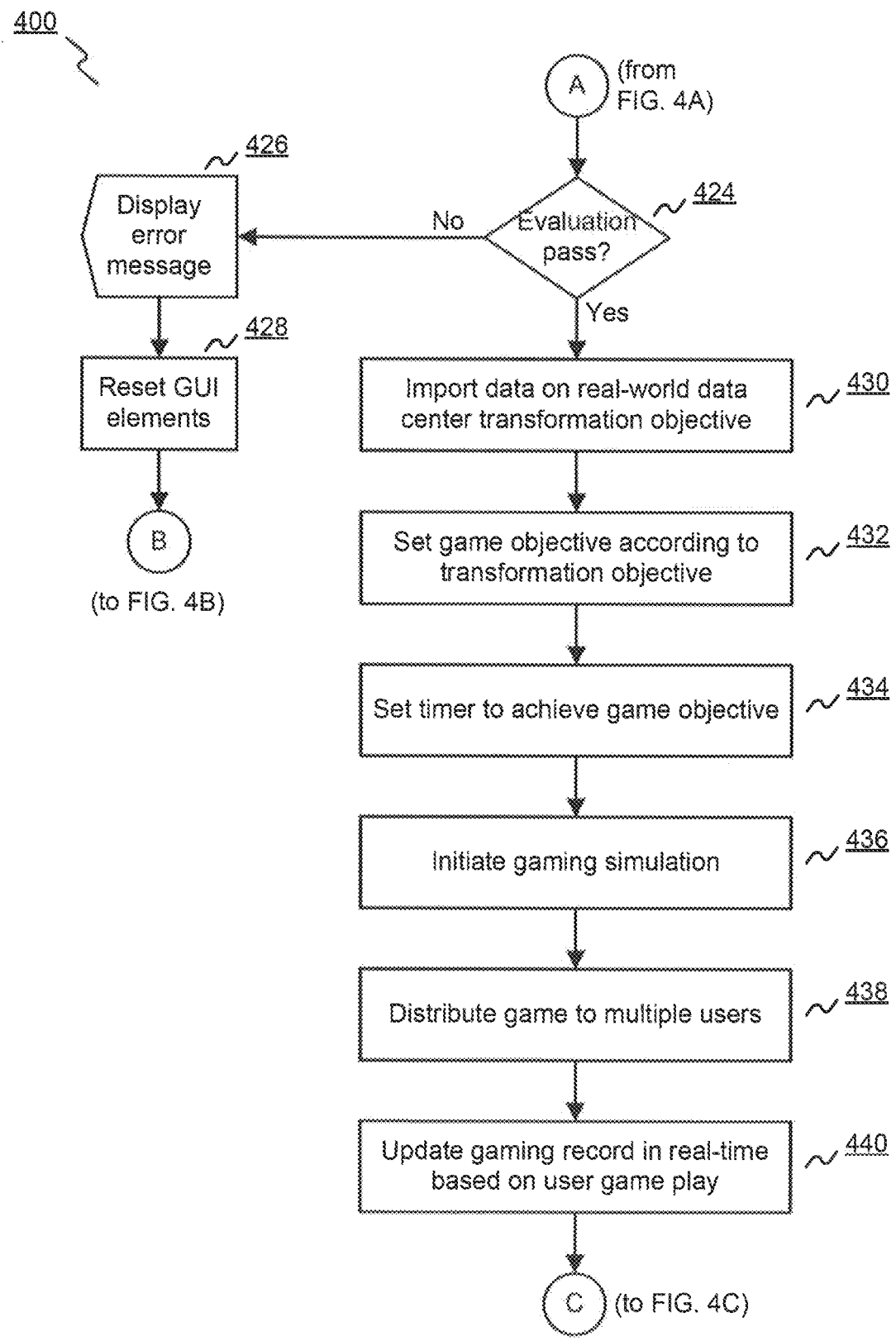
Figure 4C:
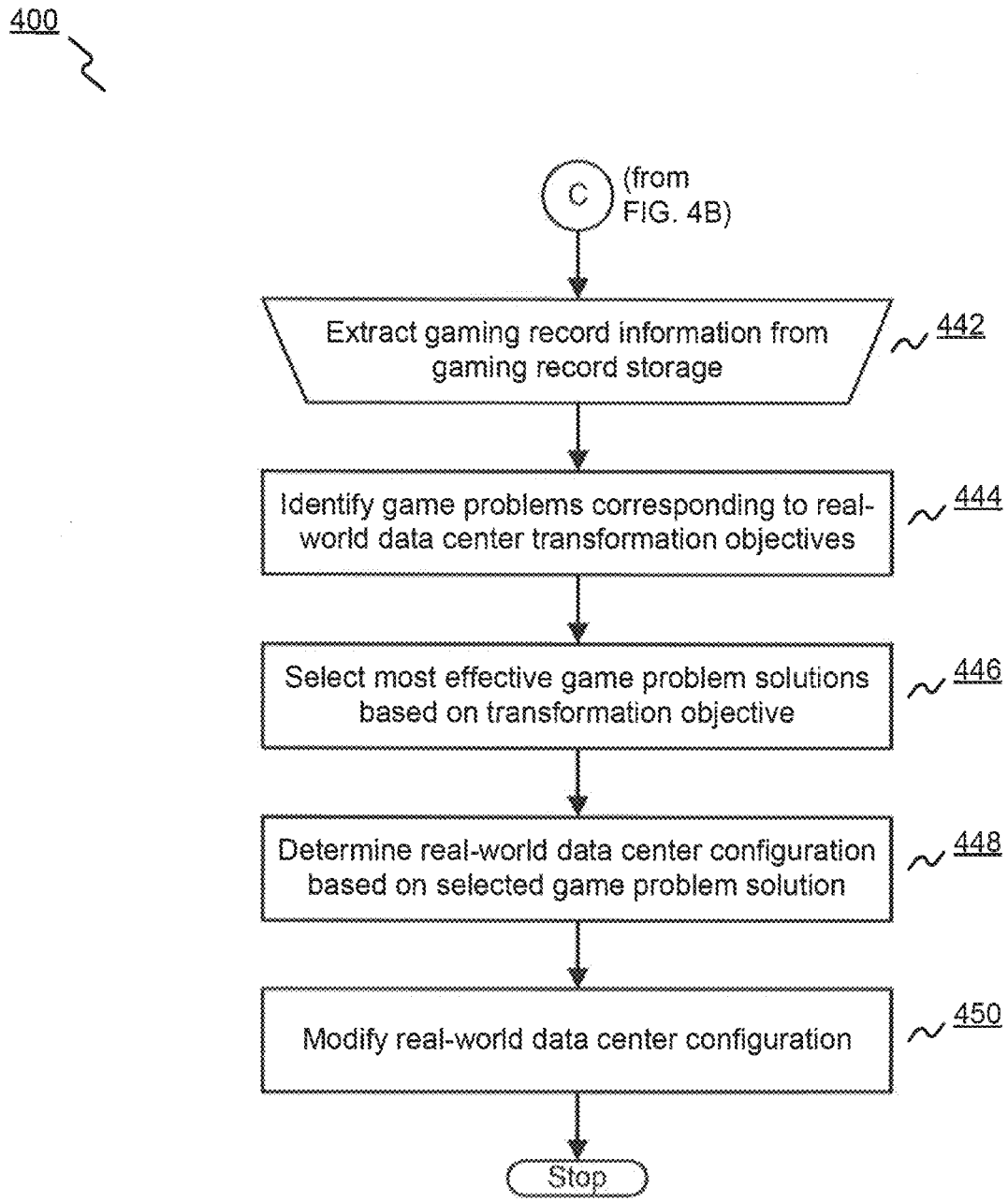

FIGS. 4A-C illustrate an exemplary method 400 for data center transformation in accordance with some embodiments. With reference to FIG. 4A, at step 410, a system, such as system 200 and/or 250, may import data on a real-world data center transformation project. The system may select a game GUI template at step 412, and at step 414, may define a GUI element representation, as explained further below in this disclosure. At step 416, the system may add the GUI elements to a gaming template, and, at step 418, may define the relationships between the various GUI elements. For example, various joint constraints on the position, movement, and behavior may be imposed on various (and potentially overlapping) combinations of GUI elements. At step 420, the system may assign rules of interaction between the gaming elements, such as the gaming environments, game stages, GUI elements, and user players. At step 422, the system may evaluate the gaming instance for compliance with rules governing the real-world data center and the gaming environment.

With reference to FIG. 4B, at step 424, if the gaming instance does not pass the evaluation, at step 426, the system may display an error message, and at step 428, the system may reset the GUI elements before jumping back to step 414 in the procedure. If the gaming instance passes the evaluation, at step 430, the system may import further data on the real-world data center transformation objectives. Accordingly, at step 432, the system may set game objectives, and at step 434 may set a timer to achieve the game objectives. At step 436, the system may initiate the gaming simulations, and at step 438 distribute the game (e.g., online) to multiple users with invitations for the users to become players in the gaming environment. Based on the users' gameplay, at step 440, the system may update the gaming record in real time.

With reference to FIG. 4C, in some embodiments, at step 442, the system may extract gaming record information from the gaming records stored in a database, and at step 444, identify game problems corresponding to real-world data center transformation objectives. At step 446, the system may select the most effective game problem solutions (e.g., based on highest points, fastest time, most laps, etc.), and, at step 448, determine what (if any) modification need to be performed to the configuration of the real-world data center so that its configuration parallels the configuration of the GUI and other gaming elements of the game in the gaming environment corresponding to the most effective game problem solutions. At step 450, the system may implement the determined modifications to be performed to the configuration of the real-world data center.

Thus, in some embodiments, the real-world data center may be improved in technological terms by the game play of the multiple users in the real-time gaming environment. For example, the game play may provide solutions to optimize for the real-world data center technical parameters such as energy efficiency, computational efficiency, computation time, computational load balance across computing systems, data security risks, as well as other parameters such as compliance with local and international laws, etc. Thus, embodiments of the present disclosure result in technological improvements, on a real-time basis, to the performance characteristics of the real-world data center based on real-time game play within an environment simulated to parallel the real-world data center configuration.

Figure 5:
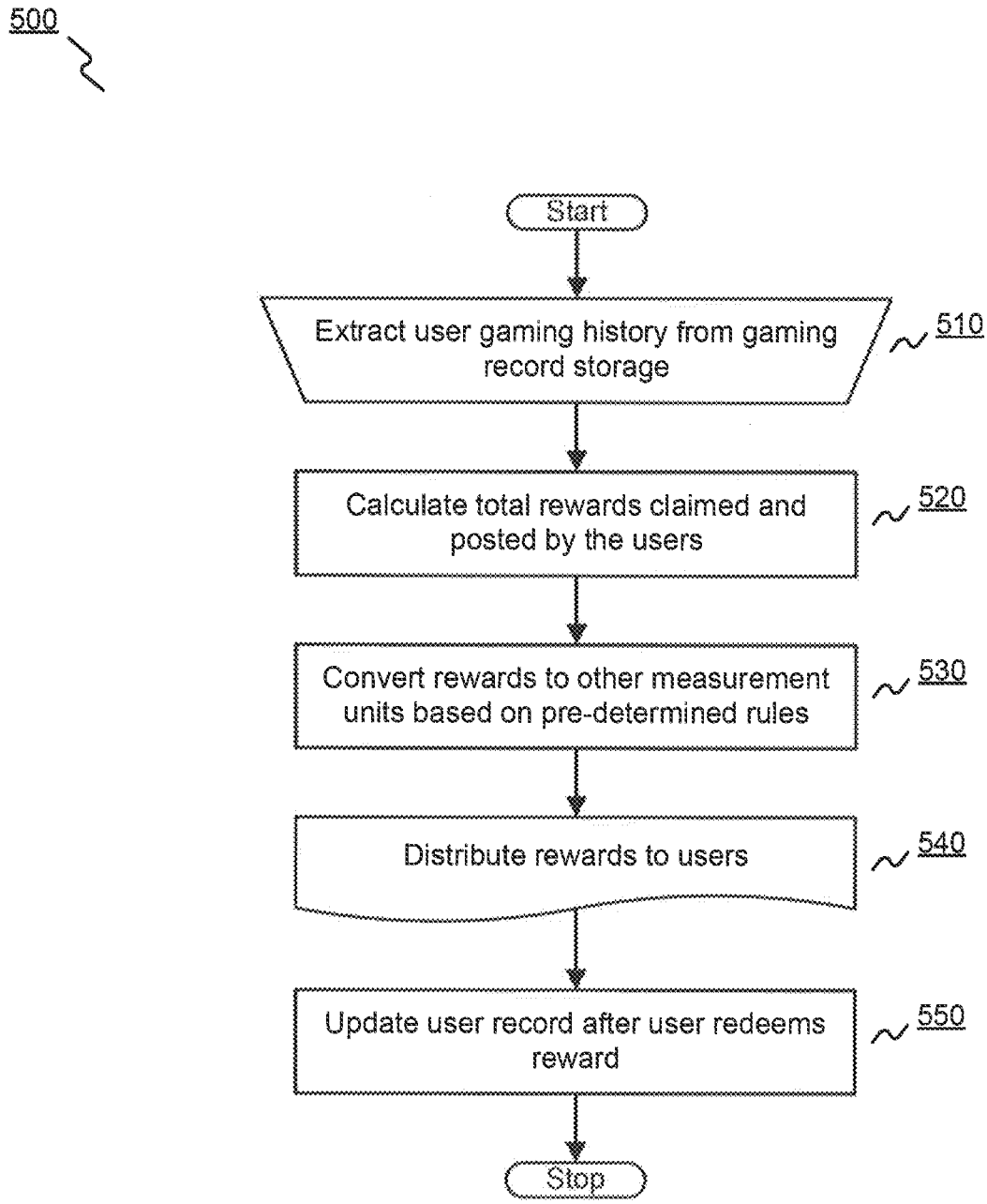
FIG. 5 illustrates an exemplary method for gaming user rewards distribution in accordance with some embodiments.

FIG. 5 illustrates an exemplary method 500 for gaming user rewards distribution in accordance with some embodiments. In some embodiments, system 200 and/or 250, at step 510, may extract user gaming history from gaming record storage. At step 520, the system may calculate a total rewards claimed by the user and/or posted by the user. At step 530, the system may convert the rewards (e.g., points) to other measurement units (e.g., airline miles, sovereign currency, etc.) based on pre-determined rules (e.g., fixed exchange rates or exchange rate look-up tables). At step 540, the system may distribute the reward to the user in the converted measurement unit (e.g., by transferring money into the user's account commensurate with the user's rewards in the gaming environment). At step 550, the system may update the user's record within the systems after distributing the user reward (e.g., after the user redeems the reward).

Figure 6:
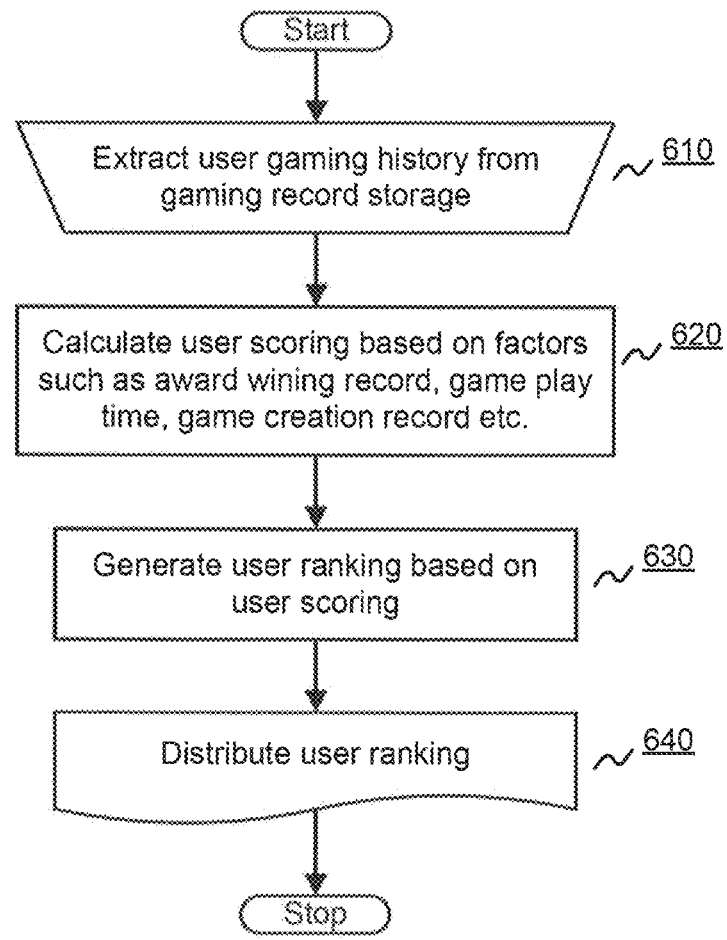
FIG. 6 illustrates an exemplary method for gaming user ranking in accordance with some embodiments.

FIG. 6 illustrates an exemplary method 600 for gaming user ranking in accordance with some embodiments. In some embodiments, system 200 and/or 250, at step 610, may extract user gaming history from gaming record storage. At step 620, the system may calculate a user scoring based on factors such as award wining record, game play time, game creation record etc. At step 630, the system may generate a user ranking based on the score, and at step 640, the system may distribute the user ranking (e.g., via a social media post, on a leaderboard within the system platform, etc.)

FIG. 7 illustrates a table 700 showing exemplary data center transformation gaming design considerations in accordance with some embodiments. In table 700, a column 710 may indicate design considerations for a virtual gaming environment, whereas a column 720 may indicate design considerations for a real-world data center. For example, the information in each row in a column 710 may correspond to the information in the same row of column 720. Thus, for example, where the problem to be solved in terms of configuration of the real-world data center is virtual machine migration (see 721), the corresponding problem to be solved in the virtual gaming environment may be a deer plucking fruits off a tree (see 711). In the real-world data center context, an objective may be to move the virtual machine to the cloud (see 722). Corresponding to this objective, a game goal 712 may be for a deer GUI element to reach and pluck fruit (see 712). In the real world data center context, several elements or factors 723 may define boundaries within which the virtual machine migration can occur. Correspondingly, in the virtual gaming context, game elements 713 may define boundaries within which the deer must pluck the fruit. In the real-world data center context, several transformation parameters 724 may be defined, such as virtual machine movement parameters, configuration of cloud parameters, configuration of parameters for the virtual machine, compliance rules, and resource allocation constraints. In the virtual gaming context, these parameters may be translated into parameters governing the position, movement, and behavior of GUI elements, such as distance from deer to the fruits, size and attributes of the deer, size and attributes of the fruit, constraints on how the deer can jump, etc. Further, in the real-world data center context, data center transformation constraints 725 may be included in terms of resources available and transformations that are disallowed.

Correspondingly, the virtual gaming environment may be subject to constraints 714 such as game rules on how many times the deer can jump and what damage a deer can cause to other GUI elements.

Figure 8:
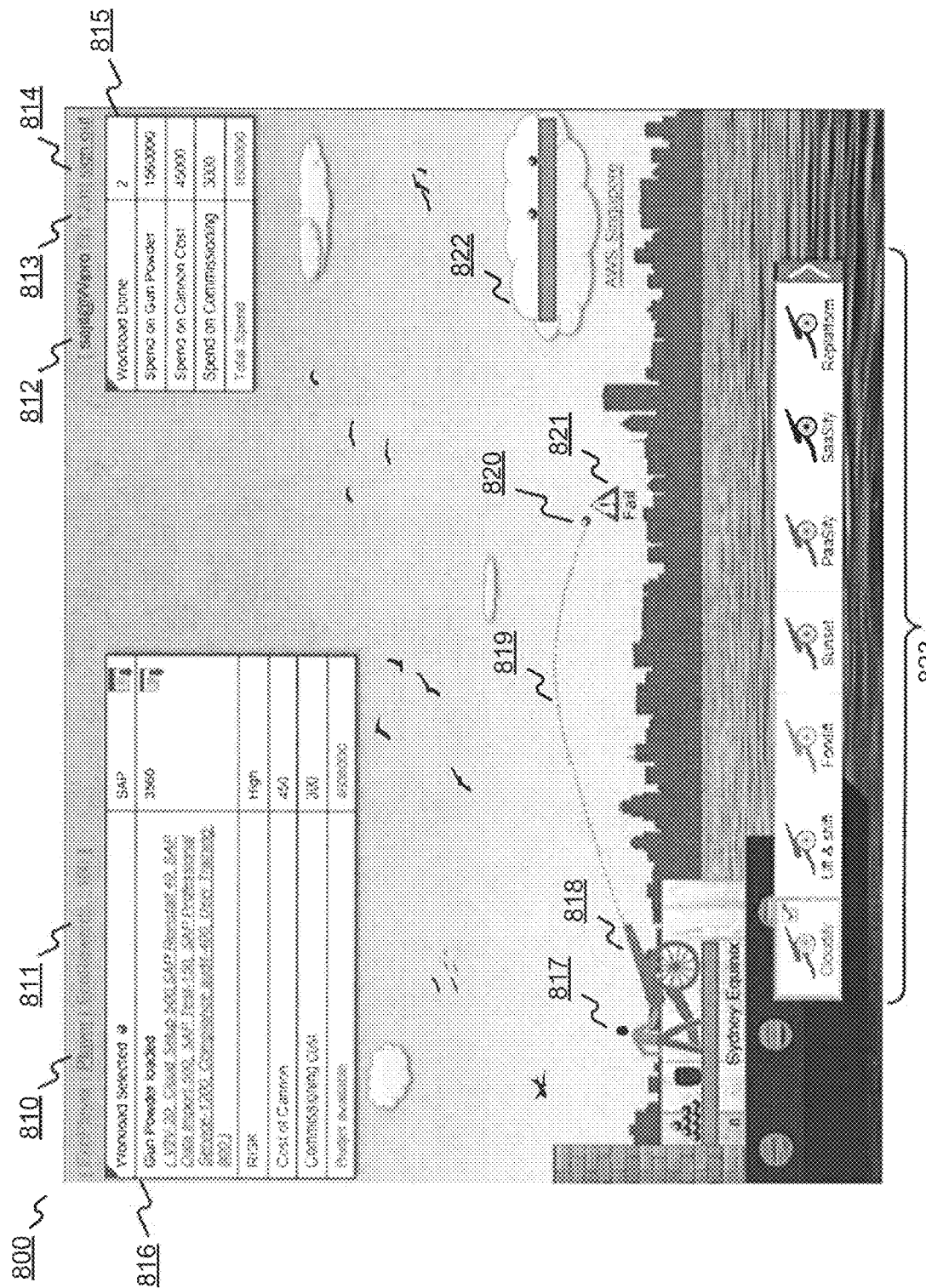
FIG. 8 is a screenshot illustrating a data center transformation gaming environment 800 in accordance with some embodiments.

FIG. 8 is a screenshot illustrating a data center transformation gaming environment 800 in accordance with some embodiments. In the gaming environment 800, a player (see 810) may login (see 814) with a user ID (see 812), and may earn rewards (see 811) based on the time (see 813) or effort (see 815) the user has put into game play, and outcomes the player has achieved in game play (see 816). The gaming environment may include a GUI element 817 representing the player, and various GUI elements representing parallels to configuration parameters of a real-world data center. For example, cannon 818, trajectory 819, cannonball 820, and cloud 822 may parallel constraints related to the real-world data center. Also, a play outcome 821 may correspond to whether the solution proffered by the user (e.g., defined by choice of player position, cannon 823, cannonball, angle of firing, force of firing, aim, etc.) would be an optimal choice for reconfiguring the real-world data center.

Computer System

Figure 9:
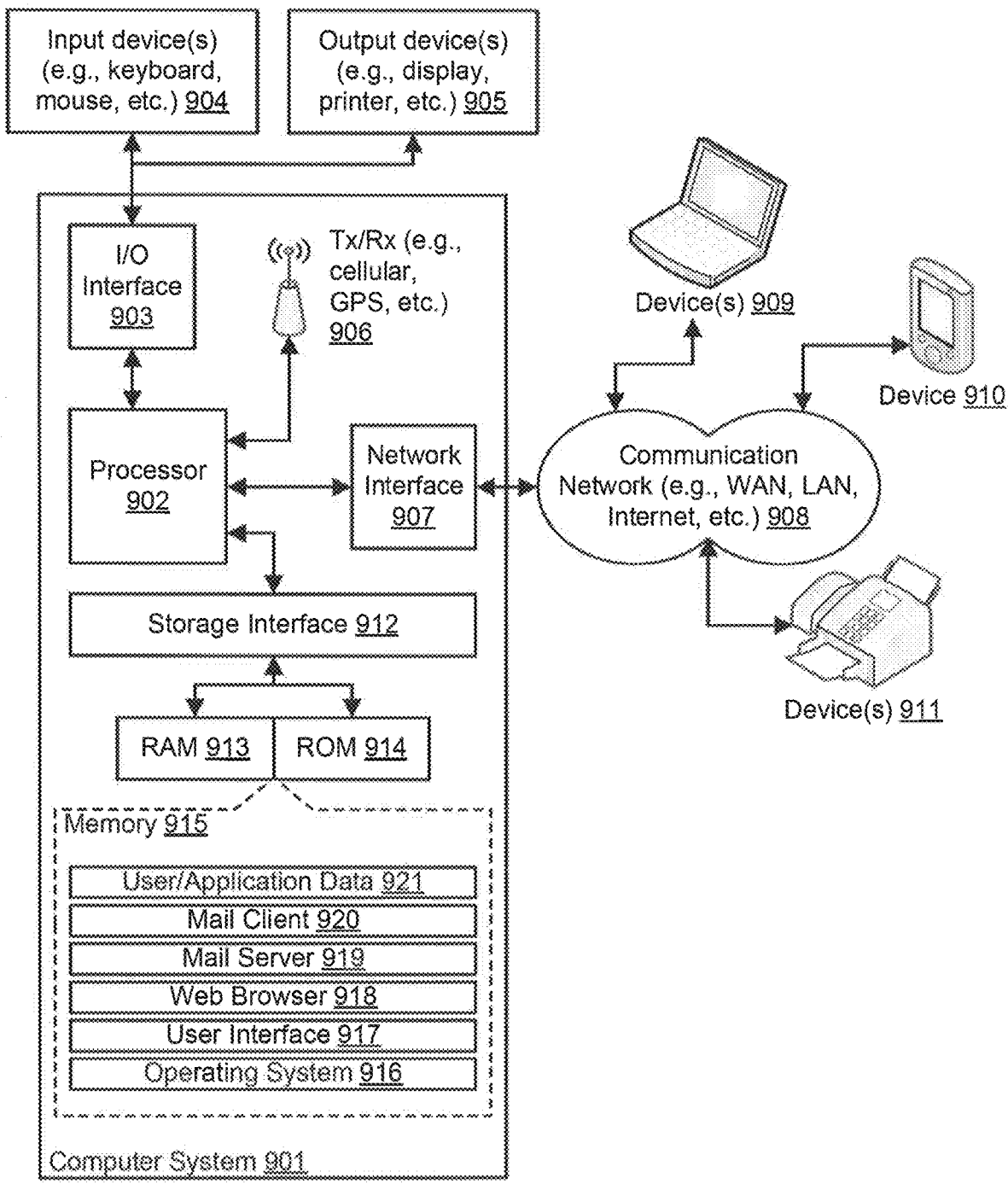
FIG. 9 is a block diagram of an exemplary computer system for implementing embodiments consistent with the present disclosure.

FIG. 9 is a block diagram of an exemplary computer system for implementing embodiments consistent with the present disclosure. Variations of computer system 901 may be used for implementing the devices and systems disclosed herein. Computer system 901 may comprise a central processing unit ("CPU" or "processor") 902. Processor 902 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base 1), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 910, 911, and 912. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for gamification of data center transformation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A data center transformation system, comprising:
a hardware processor; and
a memory unit storing instructions that, when executed by the hardware processor, cause the hardware processor to perform acts comprising:
dynamically generating in real-time a multi-player gaming environment including a plurality of graphical elements representing real world data center context,
wherein the generation is based on a configuration of the real world data center and a problem ontology defining a problem to be solved through the multi-player gaming environment; and
wherein interaction of at least one user with the plurality of graphical elements through game play resolves problems associated with the real world data center context; and
wherein at least one constraint applying to one of the graphical elements in the multi-player gaming environment reflects a constraint applying to a real-world data center; and
wherein a configuration of at least one of the graphical elements in the multi-player gaming environment reflects a configuration parameter of the real-world data center;
providing the real-time dynamically-generated gaming environment to the at least one user;
validating a solution to the defined problem achieved by the interaction of the at least one user with the plurality of graphical elements through game based on the problem ontology, a domain ontology, and reviewing of the solution by one or more other users interacting in the gaming environment;
modifying the configuration of at least one graphical element from the plurality of graphical elements in the multi-player gaming environment based on the validated solution; and providing an output indicating a modified configuration of the at least one of the graphical elements in the multi-player gaming environment for modifying the configuration parameter of the real-world data center to transform the configuration of the data center.

2. The system of claim 1, the memory unit further storing instructions that, when executed by the hardware processor, cause the hardware processor to perform acts comprising:
modifying automatically the configuration parameter of the real-world data center based on the output indicating the modified configuration of the at least one of the graphical elements in the multi-player gaming environment.

3. The system of claim 2, wherein the configuration parameter of the real-world data center is modified automatically in real-time based on the output indicating the modified configuration of the at least one of the graphical elements in the multi-player gaming environment.

4. The system of claim 1, the memory unit further storing instructions that, when executed by the hardware processor, cause the hardware processor to perform acts comprising:
monitoring operations of the plurality of users during game play in the multi-player gaming environment; and
generating a roadmap for transformation of the real-world data center based on the monitoring of the operations.

5. The system of claim 2, the memory unit further storing instructions that, when executed by the hardware processor, cause the hardware processor to perform acts comprising:
generating a ranking of the plurality of users based on the monitoring of the operations; and
calculating a points reward based on the generated ranking.

6. The system of claim 1, wherein the multi-player gaming environment is provided via an online game.

7. The system of claim 1, wherein the multi-player gaming environment includes a simulation of the real-world data center.

8. A processor-implemented data center transformation method, comprising:
dynamically generating in real-time, via a hardware processor, a multi-player gaming environment including a plurality of graphical elements representing real world data center context,
wherein the generation is based on a configuration of the real world data center and a problem ontology defining a problem to be solved through the multi-player gaming environment, and
wherein interaction of at least one user with the plurality of graphical elements through game play resolves problems associated with the real world data center context; and
wherein at least one constraint applying to one of the graphical elements in the multi-player gaming environment reflects a constraint applying to a real-world data center; and
wherein a configuration of at least one of the graphical elements in the multi-player gaming environment reflects a configuration parameter of the real-world data center;
providing, via the hardware processor, the real-time dynamically-generated gaming environment to the at least one user;
validating a solution to the defined problem achieved by the interaction of the at least one user with the plurality of graphical elements through game based on the problem ontology, a domain ontology, and reviewing of the solution by one or more other users interacting in the gaming environment;
modifying, via the hardware processor, the configuration of at least one graphical element from the plurality of graphical elements in the multi-player gaming environment based on the validated solution; and
providing, via the hardware processor, an output indicating a modified configuration of the at least one of the graphical elements in the multi-player gaming environment for modifying the configuration parameter of the real-world data center.

9. The method of claim 8, further comprising:
modifying automatically, via the hardware processor, the configuration parameter of the real-world data center based on the output indicating the modified configuration of the at least one of the graphical elements in the multi-player gaming environment.

10. The method of claim 9, wherein the configuration parameter of the real-world data center is modified automatically in real-time based on the output indicating the modified configuration of the at least one of the graphical elements in the multi-player gaming environment.

11. The method of claim 8, further comprising:
monitoring, via the hardware processor, operations of the plurality of users during game play in the multi-player gaming environment; and
generating, via the hardware processor, a roadmap for transformation of the real-world data center based on the monitoring of the operations.

12. The method of claim 9, further comprising:
generating, via the hardware processor, a ranking of the plurality of users based on the monitoring of the operations; and
calculating, via the hardware processor, a points reward based on the generated ranking.

13. The method of claim 8, wherein the multi-player gaming environment is provided via an online game.

14. The method of claim 8, wherein the multi-player gaming environment includes a simulation of the real-world data center.

15. A non-transitory computer-readable medium storing hardware processor-executable data center transformation instructions comprising instructions for:
dynamically generating in real-time a multi-player gaming environment including a plurality of graphical elements representing real world data center context,
wherein the generation is based on a configuration of the real world data center and a problem ontology defining a problem to be solved through the multi-player gaming environment; and
wherein interaction of at least one user with the plurality of graphical elements through game play resolves problems associated with the real world data center context; and
wherein at least one constraint applying to one of the graphical elements in the multi-player gaming environment reflects a constraint applying to a real-world data center; and
wherein a configuration of at least one of the graphical elements in the multi-player gaming environment reflects a configuration parameter of the real-world data center;
providing the real-time dynamically-generated gaming environment to the at least one user;
validating a solution to the defined problem achieved by the interaction of the at least one user with the plurality of graphical elements through game based on the problem ontology, a domain ontology, and reviewing of the solution by one or more other users interacting in the gaming environment;

modifying the configuration of at least one graphical element from the plurality of graphical elements in the multi-player gaming environment based on the validated solution; and providing an output indicating a modified configuration of the at least one of the graphical elements in the multi-player gaming environment for modifying the configuration parameter of the real-world data center.

16. The non-transitory computer-readable medium of claim 15, the instructions further comprising instructions for:

modifying automatically the configuration parameter of the real-world data center based on the output indicating the modified configuration of the at least one of the graphical elements in the multi-player gaming environment.

17. The non-transitory computer-readable medium of claim 16, wherein the configuration parameter of the real-world data center is modified automatically in real-time based on the output indicating the modified configuration of the at least one of the graphical elements in the multi-player gaming environment.

18. The non-transitory computer-readable medium of claim 15, the instructions further comprising instructions for:

monitoring operations of the plurality of users during game play in the multi-player gaming environment; and generating a roadmap for transformation of the real-world data center based on the monitoring of the operations.

19. The non-transitory computer-readable medium of claim 16, the instructions further comprising instructions for:

generating a ranking of the plurality of users based on the monitoring of the operations; and calculating a points reward based on the generated ranking.

20. The non-transitory computer-readable medium of claim 15, wherein the multi-player gaming environment is provided via an online game.

* * * * *